United States Patent [19]

Hamada et al.

[11] Patent Number: 5,062,094
[45] Date of Patent: Oct. 29, 1991

[54] OPTICAL HEAD FOR OPTICAL DISK SYSTEM

[75] Inventors: Akiyoshi Hamada; Mitsutoshi Yagoto; Masanori Murakami, all of Osaka, Japan

[73] Assignee: Minolta Camera Kabushiki Kaisha, Osaka, Japan

[21] Appl. No.: 431,874

[22] Filed: Nov. 6, 1989

[30] Foreign Application Priority Data

| Nov. 7, 1988 | [JP] | Japan | 63-280936 |
| Nov. 16, 1988 | [JP] | Japan | 63-290915 |
| Nov. 28, 1988 | [JP] | Japan | 63-301848 |

[51] Int. Cl.$^5$ .............................................. G11B 7/12
[52] U.S. Cl. ............................ 369/44.12; 369/44.37; 369/44.41
[58] Field of Search ............... 369/44.12, 44.41, 44.42, 369/44.14, 44.37, 112, 109; 250/201.4, 201.5

[56] References Cited

U.S. PATENT DOCUMENTS

| 3,876,842 | 4/1975 | Bouwhuis . | |
| 4,475,182 | 10/1984 | Hosaka . | |
| 4,491,940 | 1/1985 | Tinet . | |
| 4,503,324 | 3/1985 | Yokota . | |
| 4,651,314 | 3/1987 | Yoshikawa et al. . | |
| 4,689,481 | 8/1987 | Ono | 369/44.14 |
| 4,768,183 | 8/1988 | Ohnishi et al. | 369/112 |
| 4,787,076 | 11/1988 | Deguchi et al. | 369/44.37 |
| 4,800,547 | 1/1989 | Kessels | 250/201.4 |
| 4,850,673 | 7/1989 | Velzel et al. | 369/112 |
| 4,894,815 | 1/1990 | Yamanaka | 369/112 |
| 4,929,823 | 5/1990 | Kato et al. | 369/44.37 |
| 4,935,911 | 6/1990 | Ohuchida et al. | 369/44.12 |
| 4,945,529 | 7/1990 | Ono et al. | 369/109 |
| 4,972,075 | 11/1990 | Hamada et al. | 250/201.5 |

FOREIGN PATENT DOCUMENTS

| 253442 | 1/1988 | European Pat. Off. . |
| 3531579A1 | 3/1986 | Fed. Rep. of Germany . |

OTHER PUBLICATIONS

Applied Optics, vol. 13, No. 6, Jun. 1974, pp. 1322-1326, "Focusing Errors in Collimating Lens or Mirror: Use of a Moire Technique".

Primary Examiner—Donald McElheny, Jr.
Attorney, Agent, or Firm—Price, Gess & Ubell

[57] ABSTRACT

An optical head for use in an optical disk system for irradiating a laser beam on an optical disk for recording or reproducing information. The optical head comprises a first and a second diffraction gratings for forming a moire pattern for detecting a focusing error, and a third diffraction grating for detecting a tracking error. The third diffraction grating has strips extending in a direction perpendicular to directions in which the strips of the first and second diffraction gratings extend.

19 Claims, 10 Drawing Sheets

OPTICAL HEAD FOR OPTICAL DISK SYSTEM

BACKGROUND OF THE INVENTION

1. Field of the Invention

The present invention relates to an optical head for use in an optical disk system for reading information from an optical disk or recording information on an optical disk, and more particularly to an optical head which carries out a focusing operation by utilizing a moire pattern.

2. Description of the Prior Art

Generally, an optical head used in an optical disk system has a focusing mechanism. European Patent Publication No. 253,442, for example, discloses a focusing mechanism for detecting a focusing error by utilizing a moire pattern formed by a pair of diffraction gratings. In the disclosed mechanism, the two diffraction gratings are arranged on an optical path between an optical disk and a detector such that strips of one diffraction grating intersect those of the other at a minute angle. This arrangement of the diffraction gratings causes the moire pattern formed on the detector to rotate in accordance with divergence of the beam. Thus, a focusing error may be detecting by measuring the rotation of the moire pattern.

On the other hand, it is necessary for the optical head of the optical disk system to carry out tracking besides focusing. In the most typical known tracking method, the laser beam is split by a diffraction grating into three beams. According to this three-beam method, the diffraction grating splits the laser beam into a zero-order beam for reading information and plus and minus first-order beams for tracking purposes. The zero-order beam is irradiated on the rows of pits of the optical disk, while the first order beams are irradiated on opposite sides of the rows of pits. A tracking correction is effected by detecting a difference in the amount reflected by the optical disk between the plus and minus first-order beams. Thus, the tracking mechanism employing the three-beam method and the focusing mechanism utilizing a moire pattern both require diffraction gratings disposed on the optical path. When the two mechanisms are used in parallel, there arises the problem of interference between the diffraction grating for tracking and the diffraction gratings for focusing.

With the focusing mechanism disclosed in the above patent publication, the plurality of pit rows act as a diffraction grating when the beam does not correctly converge on the tracks of the optical disk. In this case, the pit rows may form a false moire pattern through interference with the proper diffraction gratings disposed on the optical path, which impairs a satisfactory focusing effect.

SUMMARY OF THE INVENTION

A primary object of the present invention is to provide an optical head for use in an optical disk system for enabling focusing by utilizing a moire pattern and excellent tracking.

Another object of the invention is to provide an optical head for use in an optical disk system which combines focusing utilizing a moire pattern and tracking utilizing the three-beam method.

A further object of the invention is to provide an optical head for use in an optical disk system in which no interference occurs between the rows of pits of an optical disk and diffraction gratings arranged on an optical path for forming a moire pattern when focusing is effected by utilizing the moire pattern.

A still further object of the invention is to provide a compact optical head for use in an optical disk system for enabling diffraction gratings for forming a moire pattern for focusing purposes to be used also for tracking purposes.

The above objects are fulfilled, according to the present invention, by an optical head for use in an optical disk system for irradiating a laser beam on an optical disk for recording or reproducing information, the optical head comprising focusing means for detecting a focusing error, the focusing means including first and second diffraction gratings disposed on an optical path so as to form a moire pattern for detecting a focusing error; and tracking means for detecting a tracking error, the tracking means including a third diffraction grating disposed on the optical path so as to split a laser beam into three diffraction beams, and the strips of the third diffraction grating extending in a direction substantially perpendicular to directions in which the strips of the first and second diffraction gratings extend.

In the above construction, the strips of the two gratings for forming a moire pattern for focusing purposes extend in a direction substantially perpendicular to a direction in which the strips of the diffraction grating for producing the three beams for tracking purposes extend. This construction eliminates the possibility of forming a moire pattern by an interference between the grating for producing the three beams and the gratings for forming the moire pattern. There is no possibility also of producing a false signal occurring from a parallel arrangement.

In a further advantageous aspect of the present invention for fulfilling the foregoing objects, an optical head for use in an optical disk system for recording or reproducing information on an optical disk, comprises laser beam generating means for generating a laser beam; a first diffraction grating disposed between the laser beam generating means and the optical disk for splitting the laser beam into three diffraction beams, the strips of the first diffraction grating extending in a direction so that the three diffraction beams illuminate three different points on a track of the optical disk with respect to the widthwise direction of the track; first detecting means for detecting a focusing error by receiving one of the three diffraction beams having been reflected by the optical disk; second detecting means for detecting a tracking error by receiving two of the three diffraction beams having been reflected by the optical disk; and a second diffraction grating disposed between the optical disk and the first detecting means for forming a moire pattern on the first detecting means in cooperation with the first diffraction grating.

This construction has the advantage of requiring only two diffraction gratings in which two gratings are required for focusing and one for tracking. This allows an optical pickup apparatus to be reduced in size.

In a further advantageous aspect of the present invention for fulfilling the foregoing objects, an optical head for use in an optical disk system for recording or reproducing information on a plurality of tracks of an optical disk, comprises means for irradiating a laser beam on the optical disk; a pair of diffraction gratings disposed on an optical path of the laser beam for forming a moire pattern, the strips of the diffraction gratings extending in a direction substantially perpendicular to the longitudinal direction of the plurality of tracks; and means for evaluating the moire pattern and detecting a focusing error according to evaluation of the moire pattern.

In this construction, the two gratings for forming the moire pattern have strips extending perpendicular to the rows of pits in the optical disk. Accordingly, even if the rows of pits act as a diffraction grating, no moire pattern is formed between these rows of pits and the two gratings for forming the moire pattern for focusing. Consequently, no false focusing signal will be produced.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

First Embodiment

Figure 1:
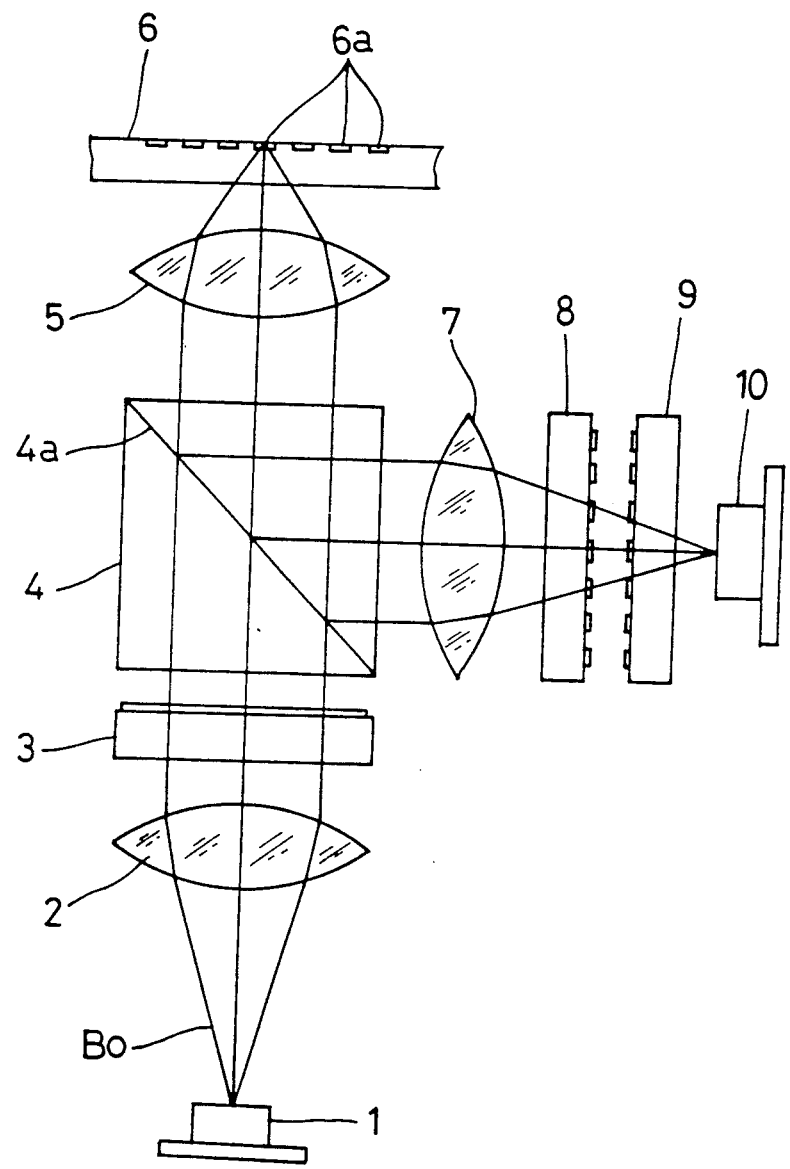
FIG. 1 is a schematic view of a light pickup apparatus according to a first embodiment of the present invention.

FIG. 1 is a view showing the construction of an optical head of an optical disk system according to a first embodiment of the invention. This embodiment employs the three-beam tracking method.

Figure 2A:
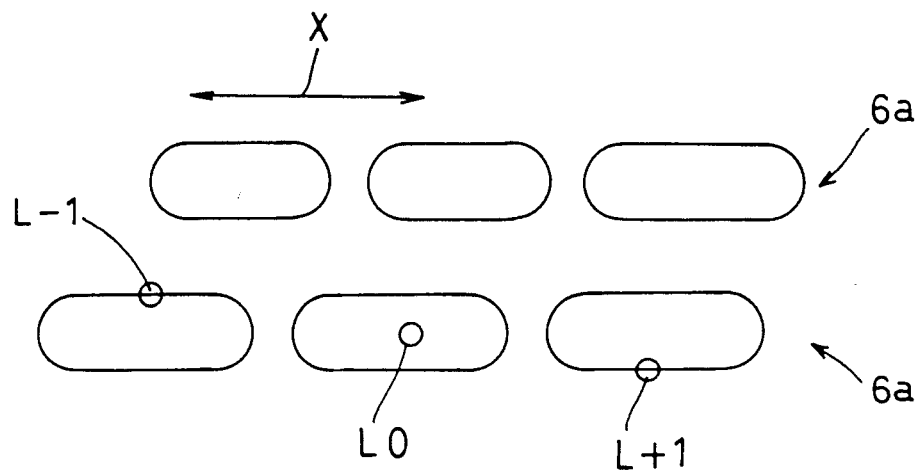
FIG. 2 is a schematic view showing relationship between light beams and pits in an optical disk.
Figure 2B:
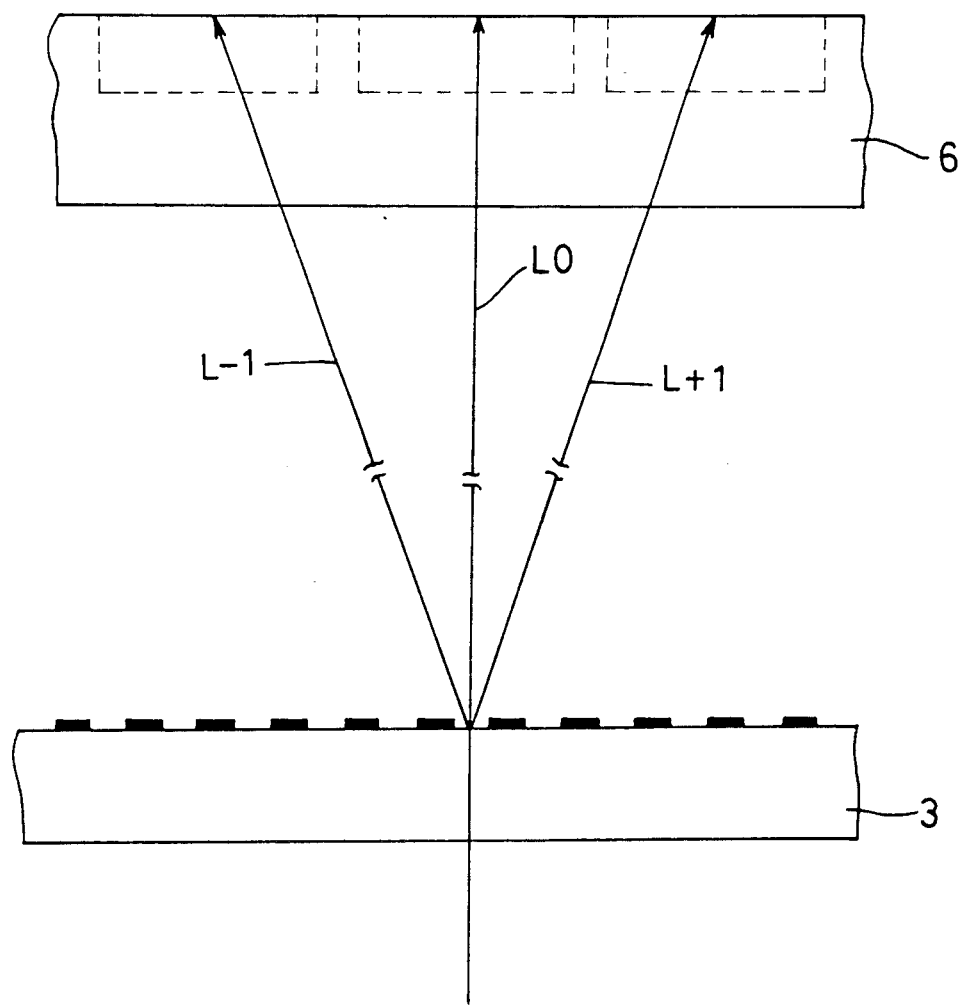

A beam B0 emitted from a semiconductor laser 1 is collimated by a collimator lens 2 for entry to a diffraction grating 3 having strips extending substantially parallel to the sheet of FIG. 1. This diffraction grating 3 produces a zero-order beam L0 for focusing and reading information recorded on an optical disk 6, and first-order beams L+1 and L−1 used for tracking (see FIG. 2). These three diffraction beams travel through a beam splitter 4 having a reflecting plane 4a having an angle of 45 degrees to an optical axis and through an objective lens 5 to be projected onto a track surface of the optical disk 6. As shown in FIG. 2, in a normal tracking state, the zero-order beam L0 is irradiated centrally of tracks (rows of pits) 6a, while the first-order beams L+1 and L−1 are irradiated on opposite sides of the same tracks or rows of bits 6a, respectively. Since the direction in which the strips of the diffraction grating 3 extend (which is parallel to the sheet of FIG. 1) is substantially perpendicular to the longitudinal direction X of tracks 6a (which is normal to the sheet of FIG. 1), the zero-order beam L0 and first-order beams L+1 and L−1 are irradiated on positions displaced from one another also in the longitudinal direction of tracks 6a.

The beams reflected by the optical disk 6 travel backward along the incident optical path through the objective lens 5. The reflected beams are then reflected rightward in FIG. 1 by the reflecting plane 4a of the beam splitter 4 to travel through a convergent lens 7 and through a pair of diffraction gratings 8 and 9 for producing a moire pattern to reach a six-section light receiving device 10. The pair of diffraction gratings 8 and 9 for producing the moire pattern for focusing purposes have parallel strips of light transmitting portions and light blocking portions arranged at fixed intervals. The gratings 8 and 9 are spaced from each other with a predetermined distance therebetween, with the strips of grating 8 and those of grating 9 rotated with respect to each other by a small angle e. The angle e is in the order of several degrees to ten-odd degrees. To avoid interference between the gratings 8 and 9 and the grating 3, the strips of gratings 8 and 9 extend substantially perpendicular to the strips of grating 3.

Figure 3:
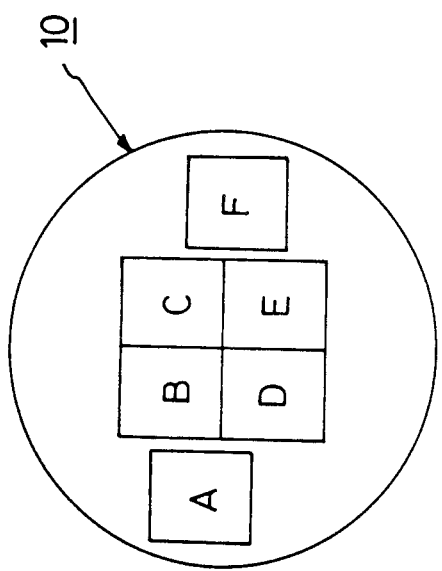
FIG. 3 is a front view of a six-section light receiving device.

As shown in FIG. 3, the six-section light receiving device 10 includes a group of four light receiving elements B-E disposed centrally thereof and light receiving elements A and F at opposite sides. The elements B-E receive the zero-order beam L0 produced by the diffraction grating 3, whereas the elements A and F receive the first-order beams L+1 and L−1, respectively.

Figure 4:
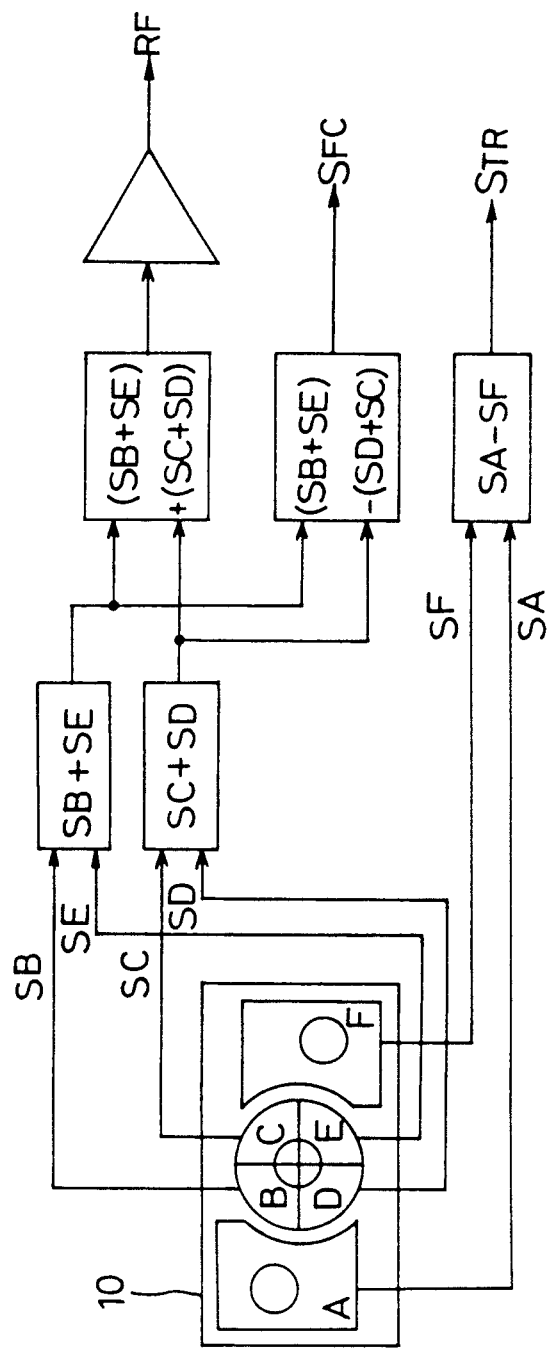
FIG. 4 is a block diagram illustrating the manner in which signals are taken out of the six-section light receiving device.

The zero-order beam L0, as a result of its passage through the gratings 8 and 9, forms a moire pattern on the group of light receiving elements B-E. The direction of this moire pattern varies with the focusing state, namely the position of the optical disk 6. Thus, a focusing error is detected by detecting an angular displacement of the moire pattern by means of light receiving elements B-E. Specifically, as shown in FIG. 4, outputs SB−SE of the light receiving elements B-E are subjected to an operation (SB+SE)−(SC+SD) to produce a focus error signal SFC which forms the basis for adjusting the objective lens 5 along the optical axis to carry out a focusing control. Details of this focusing method are described in U.S. patent application Ser. No. 169,420 (entitled "Automatic Focusing Apparatus", filed Mar. 17, 1988). An information signal (RF signal 1) representing the information recorded on the optical disk 6 is obtained by totaling the outputs (SB+SC+SD+SE) of light receiving elements B-E.

The light receiving elements A and F are arranged such that a straight line linking the two elements A and F is substantially perpendicular to the strips of the diffraction grating 3 to enable the element A to receive the plus first-order beam L+1 and the element F to receive the minus first-order beam L−1. A tracking error is detected on the basis of a difference (SA−SF) between outputs of the two light receiving elements A and F. In the normal tracking state, the outputs of the elements A and F are at the same level. When the beams are displaced right or left relative to the tracks, a difference occurs between the outputs of elements A and F, and a tracking state may be known by detecting this difference. On the basis of a tracking signal ST (=SA−SF), the objective lens 5 is adjusted in the direction perpendicular to the optical axis to carry out a tracking control. The objective lens 5 may be adjusted by a mechanism employing a voice coil or the like.

The spacing between the two diffraction gratings 8 and 9 preferably has Talbot distance l for producing a clear moire pattern. Talbot distance l is a distance that provides a clear Fourier image when light having a wave surface of radius of curvature R and wave length λ impinges upon diffraction gratings having a spacing d therebetween, and is expressed by the following equation:

$$l = (Rnd^2)/(R\lambda - nd^2)$$

Figure 5:
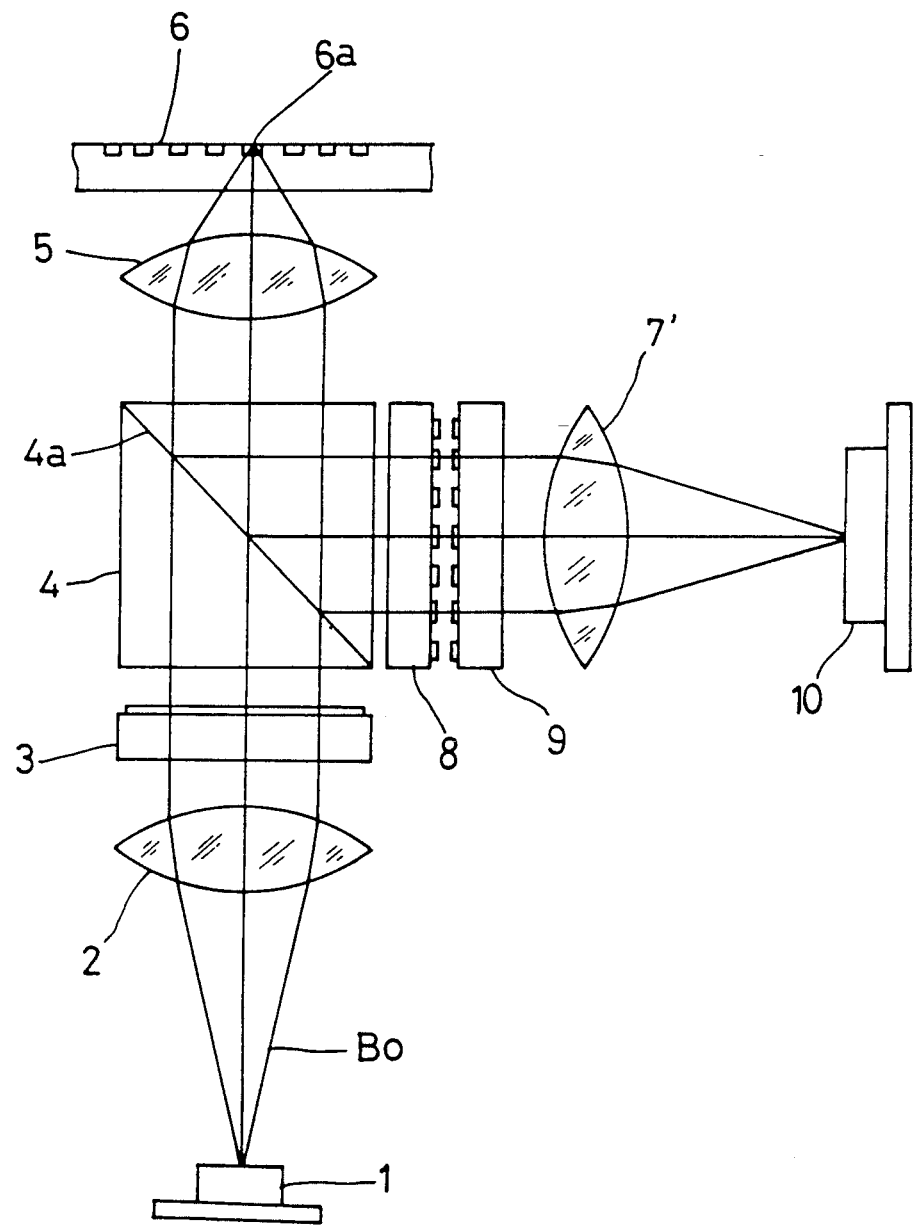
FIGS. 5 and 6 are schematic views showing modifications of the first embodiment, respectively.

FIG. 5 shows a modification of the first embodiment. This modification differs from the optical head of FIG. 1 in that the pair of diffraction gratings 8 and 9 are disposed between the beam splitter 4 and convergent lens 7. The spacing between the diffraction gratings 8 and 9 is set to Talbot distance l. This modification provides an improved detecting precision since the moire pattern produced by the diffraction gratings 8 and 9 is projected onto the six-section light receiving device 10 through the convergent lens 7.

Figure 6:
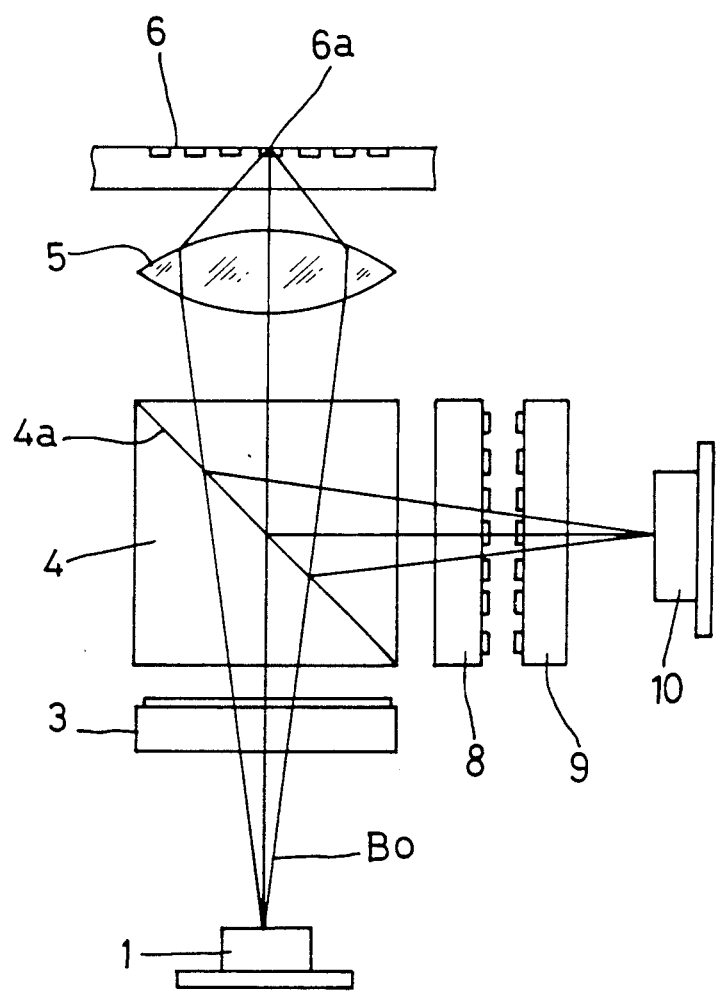

FIG. 6 shows another modification of the first embodiment. This modification differs from the optical head of FIG. 1 in that the collimator lens 2 and convergent lens 7 are omitted, to realize a compact optical head.

As described above, the strips of diffraction gratings 8 and 9 for producing the moire pattern for focusing purposes extend substantially perpendicular to the strips of diffraction grating 3 for tracking purposes in the first embodiment. Consequently, the grating 3 has no adverse influences on the focusing.

Second Embodiment

Figure 7:
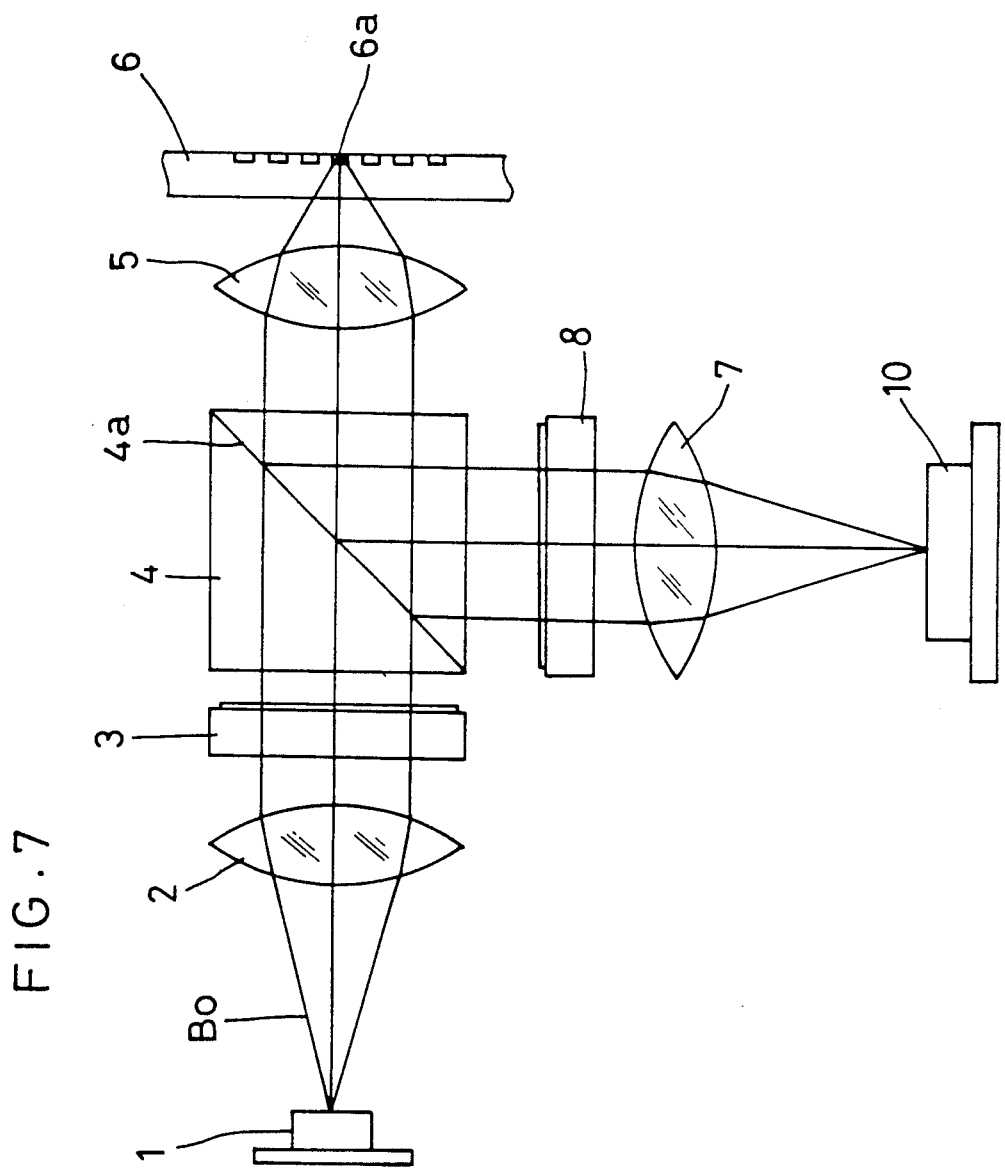
FIG. 7 is a schematic view of a light pickup apparatus according to a second embodiment of the present invention.

FIG. 7 is a view showing the construction of an optical head of an optical disk system according to a second embodiment. This embodiment also employs the three-beam tracking method, but differs from the first embodiment in that the diffraction grating that produce the three diffraction beams is positively used for focusing as well.

A beam B0 emitted from a semiconductor laser 1 is collimated by a collimator lens 2 for entry to a diffraction grating 3 having strips extending substantially parallel to the sheet of FIG. 7. This diffraction grating 3 produces three diffraction beams which travel through a beam splitter 4 having a reflecting plane 4a having an angle of 45 degrees to an optical axis and through an objective lens 5 to be projected onto the track surface of an optical disk 6. The beams reflected by the optical disk 6 travel through the objective lens 5 to be reflected by the reflecting plane 4a of the beam splitter 4, and travel through a diffraction grating 8 and a convergent lens 7 and to reach a six-section light receiving device 10. The diffraction grating 8 has strips parallel to those of the diffraction grating 3, and is disposed such that the strips of the gratings 3 and 8 are rotated with respect to each other by a small angle α. Consequently, a moire pattern is produced at the position of this grating 8. Since the direction in which the strips of the diffraction gratings 3 and 8 extend is substantially perpendicular to the longitudinal direction X of tracks 6a, the zero-order beam L0 and first-order beams L+1 and L−1 are irradiated on positions displaced from one another also in the longitudinal direction of tracks 6a (see FIG. 2).

According to the above construction, as in the first embodiment, the zero-order beam L0 from the diffraction grating 3 is used for reading recorded information, and the first-order beams L+1 and L−1 for tracking. This embodiment is the same as the first embodiment in the construction of the six-section light receiving device 10, the focusing method and tracking method, and their description will not be described. The second embodiment includes one less diffraction gratings than the first embodiment, thereby realizing a compact optical head.

Figure 8:
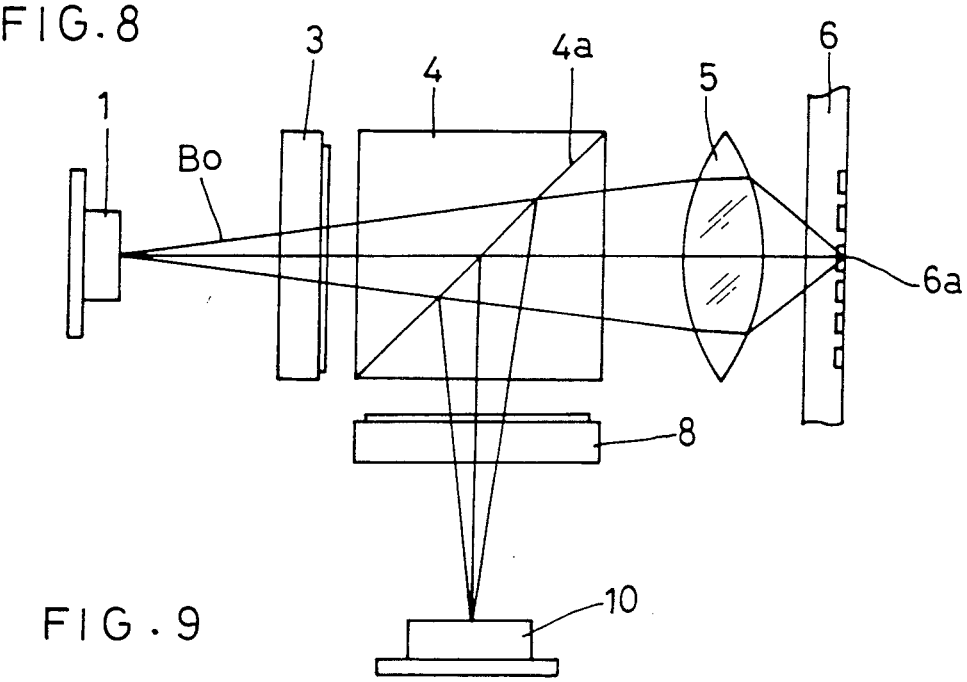
FIGS. 8 and 9 are schematic views showing modifications of the second embodiment, respectively.

FIG. 8 shows a modification of the second embodiment. This modification differs from the optical head of FIG. 7 in that the collimator lens 2 and convergent lens 7 are omitted, to realize a still more compact optical head.

Figure 9:
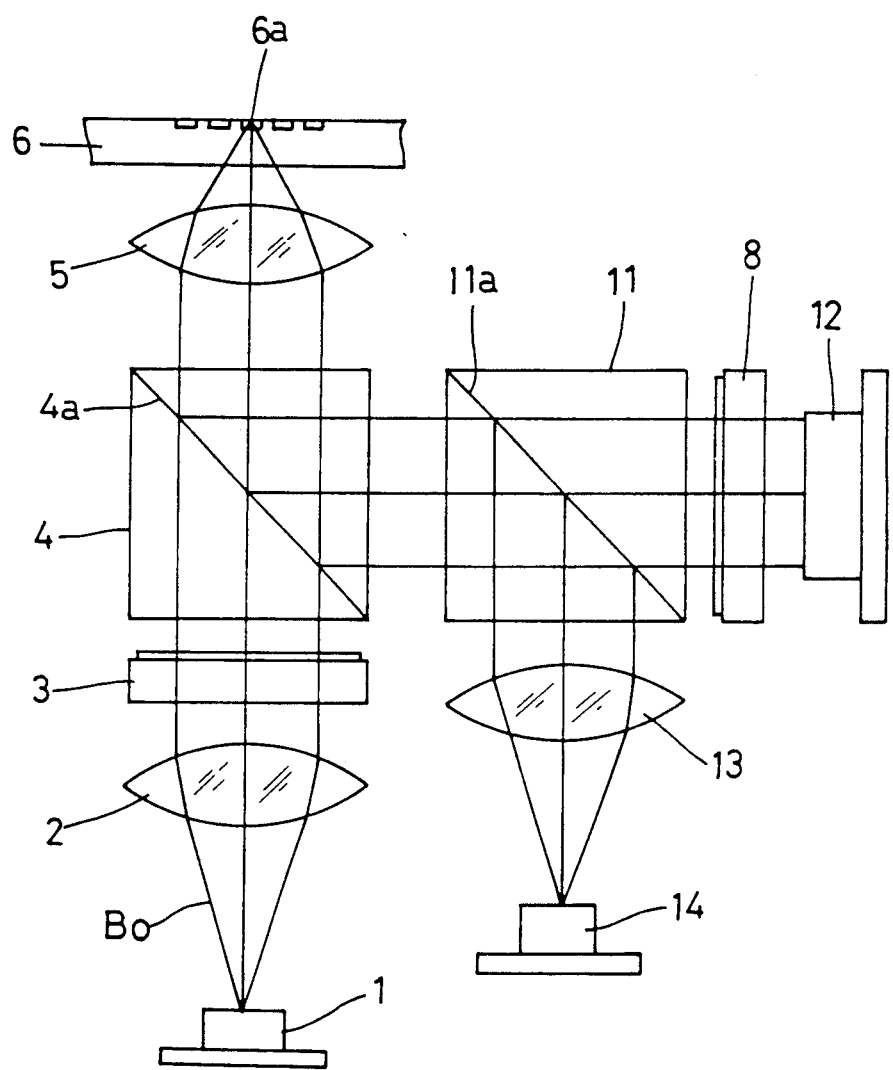

FIG. 9 shows another modification of the second embodiment. This modification differs from the optical heads of FIGS. 7 and 8 in that the beams are split for focusing and tracking in view of the slight influences of the diffraction grating 8 on the tracking.

In FIG. 9, the beams reflected by the optical disk 6 travel through the objective lens 5 to be reflected by the reflecting plane 4a of the beam splitter 4. Thereafter, the beams are split by another beam splitter 11 to proceed in two different directions. More particularly, the beams having passed through a reflecting plane 11a of the beam splitter 11 travel through a diffraction grating 8 for impingement upon a four-section light receiving device 12 to be used for reading the recorded information, while the beams reflected by the reflecting plane 11a travel through a convergent lens 13 for impingement upon a two-section light receiving device 14 to be used for tracking. The four-section light receiving device 12 has light receiving elements for receiving the zero-order beam, and the two-section light receiving device 14 has light receiving elements for receiving the plus and minus first-order beams. Thus, the four-section light receiving device 12 fulfills the function of the elements B−E of the six-section light receiving device 10 shown in FIG. 3, with the two-section light receiving device 14 fulfilling the function of the elements A and F. Consequently, the first-order beams for detecting a tracking error are entirely free from the influence of the diffraction grating 8, thereby realizing an excellent tracking control.

In the constructions shown in FIGS. 7 through 9, the spacing between the diffraction gratings 3 and 8 preferably is set to Talbot distance l for producing a clear moire pattern.

Since, in the second embodiment, the strips of the diffraction gratings 3 and 8 extend substantially perpendicular to the longitudinal direction of the tracks of the optical disk, no adverse effect is produced on the focusing operation even when the tracks act as a diffraction grating.

Third Embodiment

Figure 10:
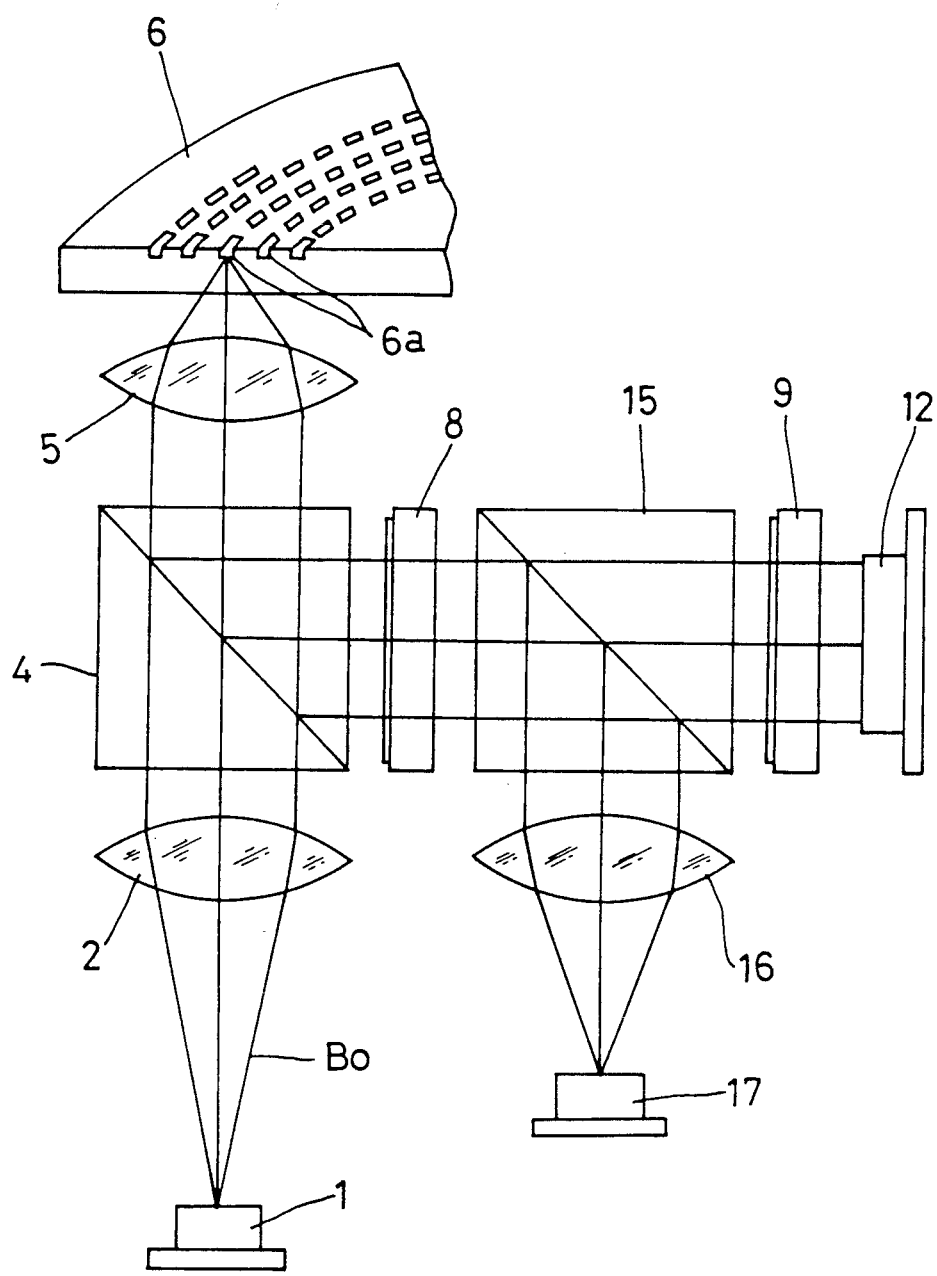
FIG. 10 is a schematic view of a light pickup apparatus according to a third embodiment of the invention.

FIG. 10 is a view showing the construction of an optical head of an optical disk system according to a third embodiment. As distinct from the preceding embodiments, this embodiment employs the push-pull method for tracking.

A beam B0 emitted from a semiconductor laser 1 is collimated by a collimator lens 2, and travels through a beam splitter 4 having a reflecting plane 4a having an angle of 45 degrees to an optical axis and through an objective lens 5 to be projected onto the track surface of an optical disk 6. The beam reflected by the optical disk 6 travels through the objective lens 5 to be reflected by the reflecting plane 4a of the beam splitter 4, and travels through a diffraction grating 8. Thereafter, the beams are split by another beam splitter 15 to proceed in two different directions. The beams having passed through a reflecting plane 15a of the beam splitter 15 travel through a diffraction grating 9 for impingement upon a four-section light receiving device 12 to be used for focusing purposes, while the beams reflected by the reflecting plane 15a travel through a convergent lens 16 for impingement upon a two-section light receiving device 17 to be used for information reading and tracking. The diffraction gratings 8 and 9 are spaced from each other with a predetermined distance therebetween, with the strips of grating 8 and those of grating 9 rotated with respect to each other by a small angle e. To avoid interference between the gratings 8 and 9 and the grating 3, the strips of gratings 8 and 9 extend substantially perpendicular to the rows of pits.

Figure 11A:
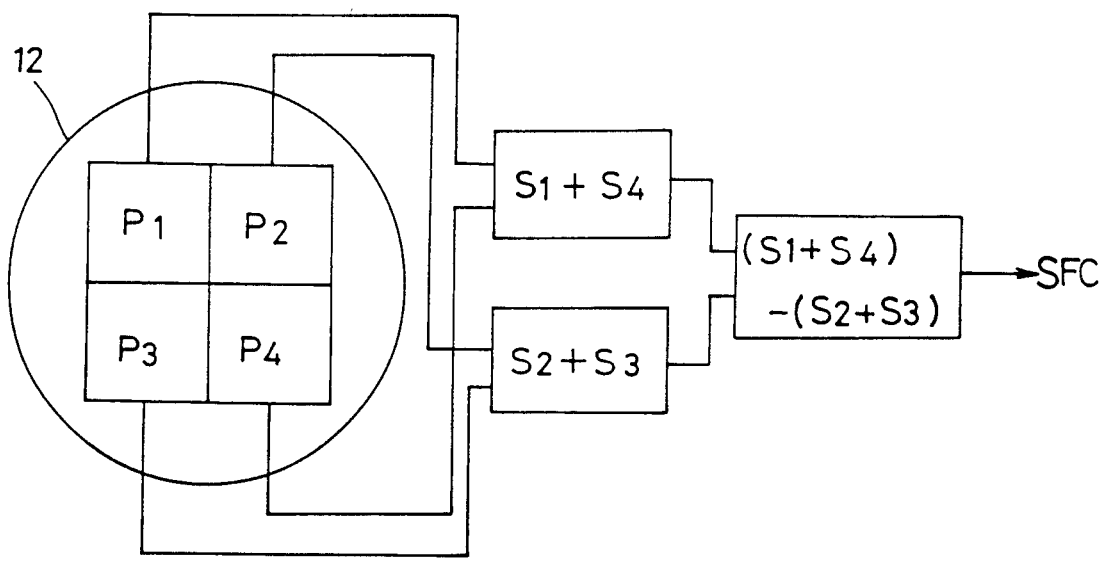
FIG. 11A is a block diagram illustrating the manner in which signals are taken out of a four-section light receiving device used in the light pickup apparatus shown in FIG. 10.

As shown in FIG. 11A, the four-section light receiving device 12 includes a group of four light receiving elements P1-P4. These elements P1-P4 detect an angular displacement of the moire pattern as do the light receiving elements B-E of the first embodiment shown in FIG. 2. Specifically, a focusing signal SFC is obtained from a difference between the sum of outputs S1 and S4 of the elements P1 and P4 and the sum of outputs S2 and S3 of the elements P2 and P3. A straight line linking the elements P1 and P3 and a straight line linking the elements P2 and P4 are substantially parallel to the strips of the diffraction gratings 8 and 9.

Figure 11B:
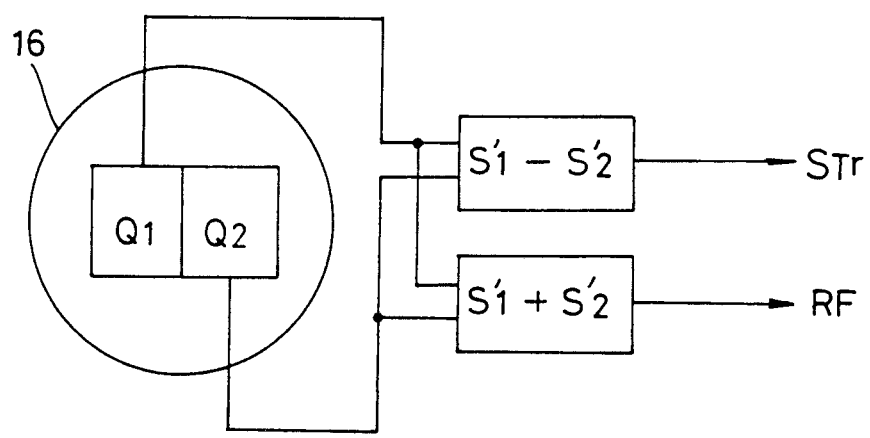
FIG. 11B is a block diagram illustrating the manner in which signals are taken out of a two-section light receiving device used in the light pickup apparatus shown in FIG. 10.

As shown in FIG. 11B, the two-section light receiving device 17 includes two light receiving elements Q1 and Q2. The two elements Q1 and Q2 detect a tracking error by the push-pull method. In the push-pull method, the far field pattern of the light reflected by the optical disk is detected. When tracking is normal, the intensity distribution of the beams is symmetrical sideways. When the beams strikes edges of the tracks, the intensity distribution of the beams becomes asymmetrical due to diffraction phenomenon. Consequently, a tracking error may be detected by detecting the far field pattern by means of the two-section light receiving device 17. Specifically, the two elements Q1 and Q2 are arranged such that a straight line linking the elements Q1 and Q2 is parallel to the tracks. A tracking signal STR is obtained from a difference between outputs S1' and S2' of the two elements Q1 and Q2. A signal RF reflecting recorded information is obtained by adding outputs S1' and S2'.

In the third embodiment too, the spacing between the diffraction gratings 8 and 9 preferably is set to Talbot distance l in order to produce a clear moire pattern. However, where the beam splitter 15 is present between the gratings 8 and 9 as in this example, Talbot distance is extended by an amount corresponding to the refractive index of the material of beam splitter 15. That is, the distance l' between the two gratings may be set as expressed by the following equation where a beam splitter having a thickness l1 along the optical axis and a refractive index n is interposed between the gratings:

$$l' = (Rmd^2)/(R\lambda - md^2) - l1 + l1/n$$

Figure 12:
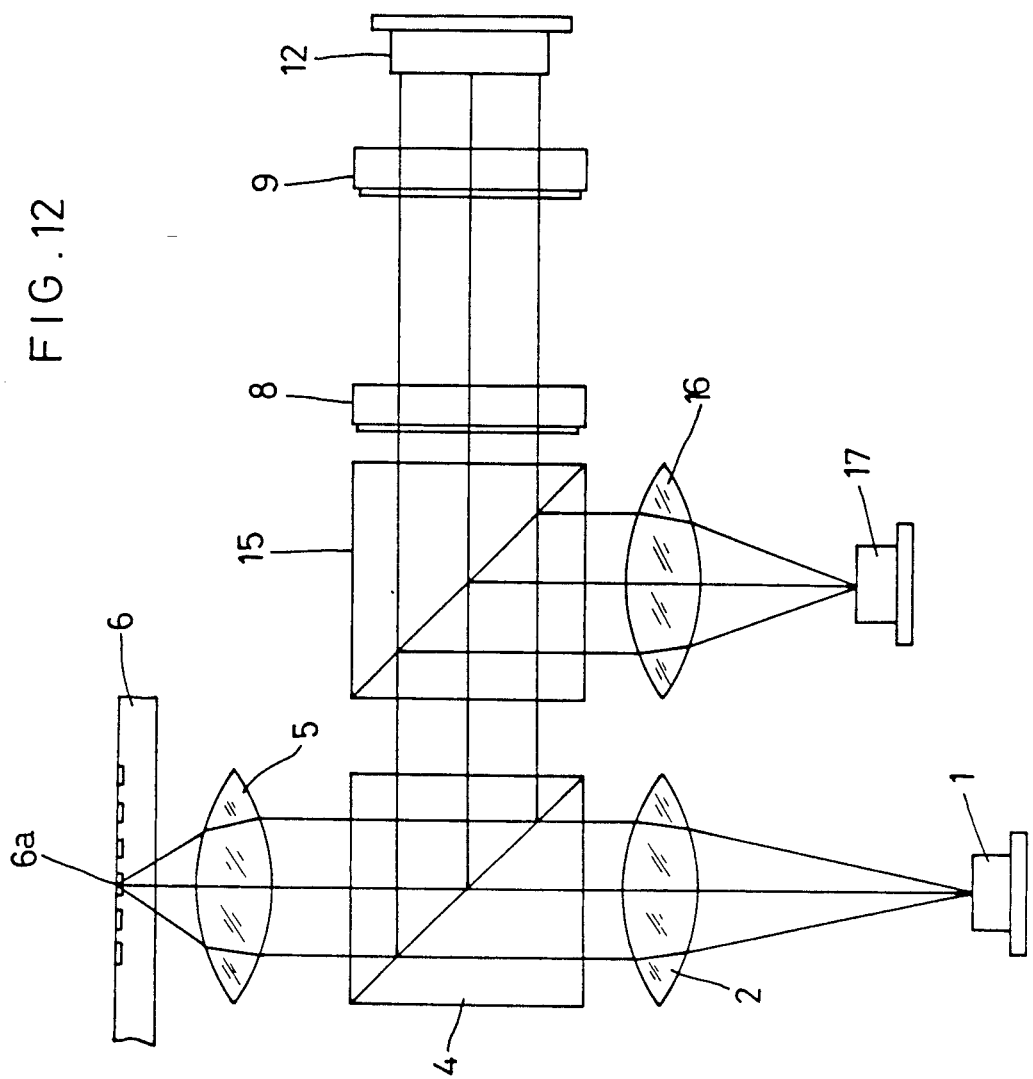
FIG. 12 is a schematic view showing a modification of the third embodiment.

FIG. 12 shows a modification of the third embodiment. This modification differs from the optical head of FIG. 10 in that the beam splitter 15 is disposed upstream of the diffraction gratings 8 and 9. This modification has some difficulty in achieving compactness compared with the example shown in FIG. 9. However, with no influence of the grating 8 on the tracking beams, this modification provides an improved tracking precision.

As described above, the strips of diffraction gratings 8 and 9 for producing the moire pattern for focusing purposes extend substantially perpendicular to the tracks of the optical disk 6. Consequently, no adverse effect is produced on the focusing operation even when the tracks act as a diffraction grating.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical head for use in an optical disk system for irradiating a laser beam on an optical disk for recording or reproducing information, said optical head comprising:

focusing means for detecting a focusing error, said focusing means including first and second diffraction gratings disposed on an optical path so as to form a moire pattern for detecting a focusing error; and tracking means for detecting a tracking error, said tracking means including a third diffraction grating disposed on the optical path so as to split a laser beam into three diffraction beams, and the strips of the third diffraction grating extending in a direction substantially perpendicular to directions in which the strips of said first and second diffraction gratings extend.

2. An optical head for use in an optical disk system for recording or reproducing information on an optical disk, comprising:

laser beam generating means for generating a laser beam;

a first diffraction grating disposed between the laser beam generating means and the optical disk for splitting the laser beam into three diffraction beams, the strips of the first diffraction grating extending in a direction so that the three diffraction beams illuminate three different points on a track of the optical disk with respect to the widthwise direction of the track;

first detecting means for detecting a focusing error by receiving one of the three diffraction beams having been reflected by the optical disk;

second detecting means for detecting a tracking error by receiving two of the three diffraction beams having been reflected by the optical disk; and a second diffraction grating disposed between the optical disk and the first detecting means for forming a moire pattern on the first detecting means in cooperation with the first diffraction grating.

3. An optical head for use in an optical disk system for recording or reproducing information on a plurality of tracks of an optical disk, comprising:

means for irradiating a laser beam on the optical disk;

a pair of diffraction gratings disposed on an optical path of the laser beam for forming a moire pattern, the strips of said diffraction gratings extending in a direction substantially perpendicular to the longitudinal direction of said plurality of tracks; and means for evaluating the moire pattern and detecting a focusing error according to evaluation of the moire pattern.

4. An optical head for use in an optical disk system employing a three-beam tracking adjustment method and a focusing adjustment using a moire pattern, comprising:

a laser beam source;

a diffraction grating for splitting a laser beam emitted from said laser beam source into three diffraction beams;

an objective lens for irradiating said diffraction beams onto recording tracks of an optical disk;

a beam splitter for deflecting the beams reflected by said recording tracks;

moire-forming diffraction grating means for producing a moire pattern by using the beams deflected by said beam splitter; and light receiving means for detecting said moire pattern and said deflected beams;

wherein said diffraction grating and said moire-forming diffraction grating means have strips extending substantially perpendicular to one another.

5. An optical head as claimed in claim 4, further comprising a collimator lens disposed between said laser beam source and said diffraction grating for collimating the laser beam, and a convergent lens disposed downstream of said beam splitter with respect to a direction of travel of said beams deflected by said beam splitter.

6. An optical head as claimed in claim 5, wherein said convergent lens is disposed between said beam splitter and said moire-forming diffraction grating means.

7. An optical head as claimed in claim 5, wherein said convergent lens is disposed between said moire-forming diffraction grating means and said light receiving means.

8. An optical head as claimed in claim 4, wherein said light receiving means comprises a split light receiving type including a first detecting portion for detecting the moire pattern and a second detecting portion for detecting the three deflected beams.

9. An optical head for use in an optical disk system employing a three-beam tracking adjustment method and a focusing adjustment using a moire pattern, comprising:

a laser beam source;

a first diffraction grating for splitting a laser beam emitted from said laser beam source into three diffraction beams;

an objective lens for irradiating said diffraction beams onto recording tracks of an optical disk;

a beam splitter for deflecting the beams reflected by said recording tracks;

a second diffraction grating for producing a moire pattern by using the beams deflected by said beam splitter; and light receiving means for detecting said moire pattern and said beams deflected by said beam splitter;

wherein said first and second diffraction gratings have strips extending substantially perpendicular to said recording tracks.

10. An optical head as claimed in claim 9, further comprising a collimator lens disposed between said laser beam source and said first diffraction grating for collimating the laser beam, and a convergent lens disposed downstream of said beam splitter with respect to a direction of travel of said beams deflected by said beam splitter.

11. An optical head as claimed in claim 10, wherein said convergent lens is disposed between said second diffraction grating and said light receiving means.

12. An optical head as claimed in claim 9, wherein said light receiving means comprises a split light receiving type including a first detecting portion for detecting the moire pattern and a second detecting portion for detecting the three deflected beams.

13. An optical head as claimed in claim 9, further comprising a second beam splitter disposed between said beam splitter and said second diffraction grating, wherein said light receiving means includes a first light receiving element for detecting the moire pattern produced by said second diffraction grating by using the beams having passed through said second beam splitter, and a second light receiving element for detecting the beams deflected by said second beam splitter.

14. An optical head as claimed in claim 13, further comprising a collimator lens disposed between said laser beam source and said first diffraction grating for collimating the laser beam, and a convergent lens disposed between said second beam splitter and said second light receiving element.

15. An optical head for use in an optical disk system employing a push-pull adjustment method and a focusing adjustment using a moire pattern, comprising:

a laser beam source;

an objective lens for irradiating diffraction beams onto recording tracks of an optical disk;

a beam splitter for deflecting the beams reflected by said recording tracks;

diffraction grating means for producing a moire pattern by using the beams deflected by said beam splitter, said diffraction grating means including a first diffraction grating and a second diffraction grating; and light receiving means for detecting said moire pattern and said beams deflected by said beam splitter;

wherein said diffraction grating means is disposed so as to have strips extending substantially perpendicular to said recording tracks.

16. An optical head as claimed in claim 15, further comprising a second beam splitter for further deflecting the beams deflected by said beam deflector, wherein said light receiving means includes a first detecting portion for detecting the moire pattern produced by said diffraction grating means, and a second detecting portion for detecting the beams deflected by said second beam splitter.

17. An optical head as claimed in claim 16, further comprising a collimator lens disposed between said laser beam source and said first diffraction grating for collimating the laser beam, and a convergent lens disposed between said second beam splitter and said second light receiving element.

18. An optical head as claimed in claim 16, wherein said second beam splitter is disposed between said first diffraction grating and said second diffraction grating.

19. An optical head as claimed in claim 16, wherein said second beam splitter is disposed between said first beam splitter and said diffraction grating means.

* * * * *